United States Patent [19]
Kreitz et al.

[11] 3,709,472
[45] Jan. 9, 1973

[54] DEVELOPMENT DEVICE

[75] Inventors: Richard W. Kreitz, Eagan Township, Dakota County; John A. Svendsen, Saint Paul, both of Minn.

[73] Assignee: Minnesota Mining and Manufacturing Company, St. Paul, Minn.

[22] Filed: Feb. 1, 1971

[21] Appl. No.: 111,527

[52] U.S. Cl. ................................................263/6 E
[51] Int. Cl. ........................G03g 13/20, G03g 15/20
[58] Field of Search ...263/6 E, 6 R; 346/76; 219/388

[56] References Cited

UNITED STATES PATENTS

| | | | |
|---|---|---|---|
| 3,519,253 | 7/1970 | Aser et al. | 263/6 E |
| 3,439,905 | 4/1969 | Alseth | 346/76 X |
| 3,464,680 | 9/1969 | Nakamura et al. | 263/6 E X |

*Primary Examiner*—Charles J. Myhre
*Attorney*—Kinney, Alexander, Sell, Steldt & Delahunt

[57] ABSTRACT

A device for high speed development of a latent image on a strip of heat developable film moved by a drive means along a path in the device. The device includes a heated rotatable drum about which the film is tensioned and which affords conduction of a uniform predetermined quantity of heat to all areas of the film to effect even development thereof. The device includes means to thoroughly clean the surface of the film and of the drum prior to contact therebetween, and provides a cooling means to terminate development of the film after the film is separated from the drum.

19 Claims, 5 Drawing Figures

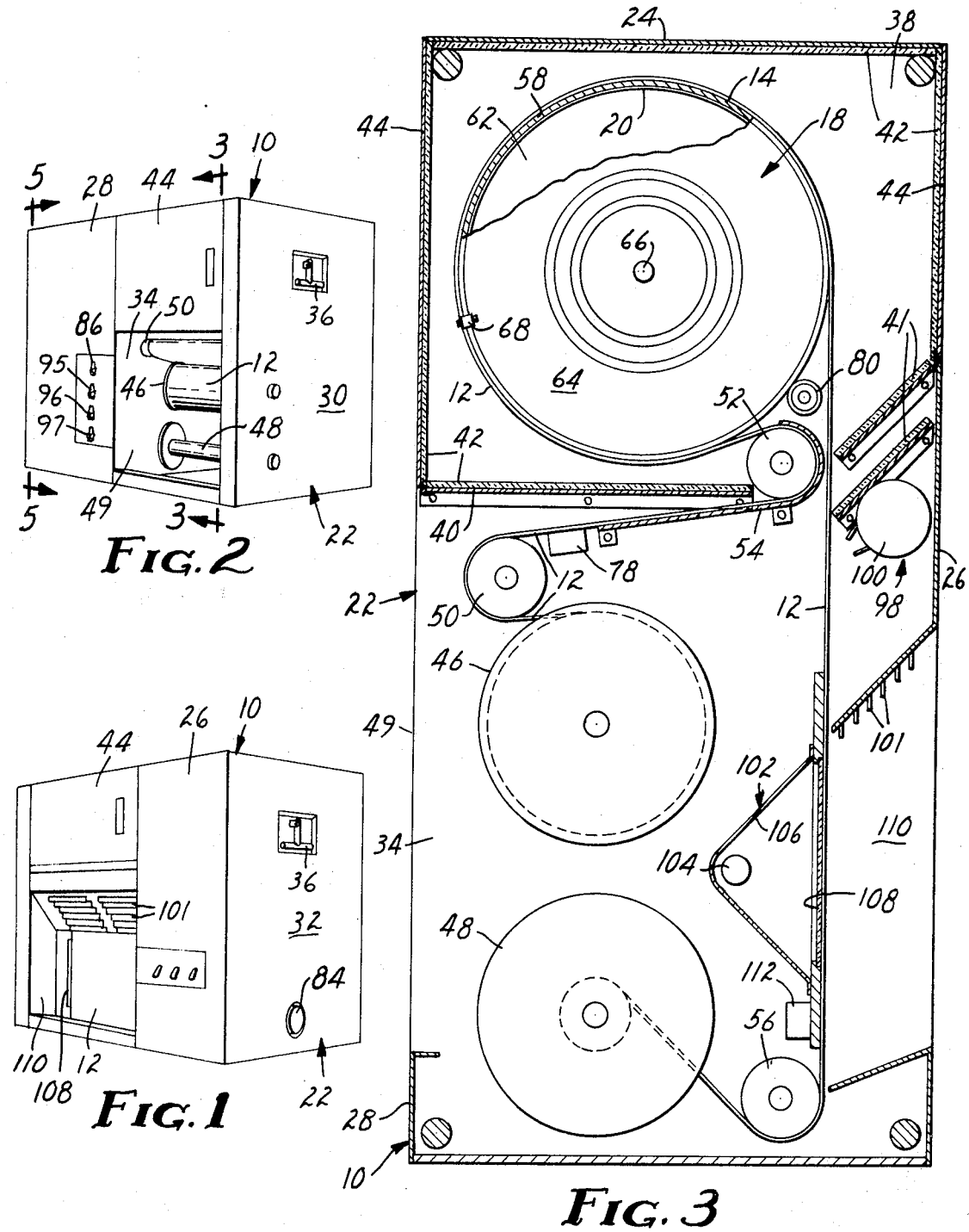

PATENTED JAN 9 1973 3,709,472

INVENTORS
RICHARD W. KREITZ
JOHN A. SVENDSEN
BY Kinney, Alexander,
Sell, Steldt & DeLaHunt
ATTORNEYS

DEVELOPMENT DEVICE

BACKGROUND OF THE INVENTION

This invention relates to a device for developing a latent image on heat developable film and in one aspect relates to a simplified device using the most efficient heat transfer mode for developing strips of heat developable film or paper.

With the increasing use of aerial photography and microfilm there has developed a need for a simplified method of making accurate reproductions of an original film which are suitable for use and/or retention in files. Machines are available which afford swift and accurate exposure of strips of copy film from an original strip of photographic film by placing an original strip of film into intimate contact with a strip of copy film in the presence of a reproduction means which may comprise a light source. This type of a machine is suitable for producing a latent image of the graphic intelligence of an original film in a heat developable coating on a copy film of the type disclosed in the Morgan and Shely U. S. Letters Pat. No. 3,457,075.

The development of a latent image in the coating of such a heat developable film requires only maintaining the coating at a given temperature within its development temperature range for a predetermined period of time (which time becomes shorter at higher development temperatures), and thus avoids the complexities and materials associated with chemical development. Film handling during heat development presents difficulties, however, particularly with heat developable coatings which soften when they are heated to a development temperature. The coating on such films may not be contacted by a surface during development. Additionally, development at high temperatures by conducting heat to the coating through the backing on the film at a high rate by contacting the uncoated side of the backing with a heated surface will produce uneven development if the conductive path between the heated surface and the film backing is interrupted. Such interruption may be caused by lack of intimate contact between the film backing and the heated surface or by an insulating material such as a spec of dust positioned between the backing and the heated surface.

The prior art devices for high speed development of heat developable film are capable of providing a uniform flow of heat to the coating on the film traveling along a path only by impinging high temperature air against the coating over a relatively long path length, or by contacting the coating with a heated liquid, and thus require large, complex, and expensive mechanisms which afford no degree of portability.

Known prior art devices for developing heat developable film by conduction of heat through the backing of the film and into the sensitive coating thereon are not suitable for high speed development of film. Such devices generally develop film by a low rate of heat conduction through the backing for a relatively long period of time so that lack of complete intimacy of contact between the film and the heated surface which may be inherent in the design of the device or may be caused by foreign particles which act as insulating material between the heated surface and the film will be compensated for by diffusion of heat flowing through the backing of the film. Such a prior art device is disclosed in U. S. Letters Pat. 3,439,905 and while this device is suitable for development of heat developable film, it is not suitable for high speed development of film for the reasons previously mentioned.

SUMMARY OF THE INVENTION

The present invention provides a relatively low cost device for the high speed development of strips of heat developable film. The present invention is capable of developing the film by uniformly conducting heat at a high rate through the backing of the film to the heat developable coating thereon.

The present invention achieves intimate contact between the film backing and a heated surface providing a uniform heat output, and provides means to insure that no foreign particles are positioned therebetween.

Additionally, a device constructed according to the present invention is sufficiently compact to afford some degree of portability.

According to the present invention there is provided a device for developing a strip of heat developable film. A path is defined through the device for a film to be developed, a portion of which defined by a portion of the uniformly heated peripheral surface of a rotatable drum about which the film is tensioned. The peripheral surface of the drum has a smooth surface finish to afford intimacy of contact with the film, and the device includes cleaning means for insuring that the surface of the drum and the film are clean prior to contact therebetween. A drive means is provided to move the film along the path at a predetermined rate so that the required amount of heat is received by each segment of the film to effect uniform development. This drive means also tensions the film extending about the drum, and thus affords intimacy of contact between the drum and film and causes rotation of the peripheral surface of the drum in synchronism with the movement of the film to be developed. A cooling means is provided to stop development of the film when it is separated from the drum.

BRIEF DESCRIPTION OF THE DRAWINGS

The invention will be more fully understood after reading the following description which refers to the accompanying drawing wherein:

FIG. 1 is a perspective view of the front and one end of a developing device constructed according to the present invention;

FIG. 2 is a perspective view of the rear and opposite end of the device of FIG. 1;

FIG. 3 is a vertical sectional view taken approximately along lines 3—3 of FIG. 2;

Referring now to FIGS. 1, 2 and 3 there is shown a device constructed according to the present invention and generally designated by the numeral 10. The device 10 is designed for developing a strip of heat developable paper or film 12 (hereinafter referred to as film 12) driven at a predetermined rate along a path defined on the device 10 by a drive means to be explained later. A uniformly heated surface defines a portion of the path and conducts heat through the backing of the film 12 to develop a heat developable coating thereon. The heated surface is the peripheral surface 14 of a cylindrical drum 18 rotatably mounted on the device 10. The drum 18 has a heating means or a heating element 20 mounted within the drum 18 to afford an even flow of heat through the peripheral surface 14 of the drum 18 to effect even development of the strip of film 12 as it moves in contact with the drum 18 along the path for a predetermined time.

Figure 4:
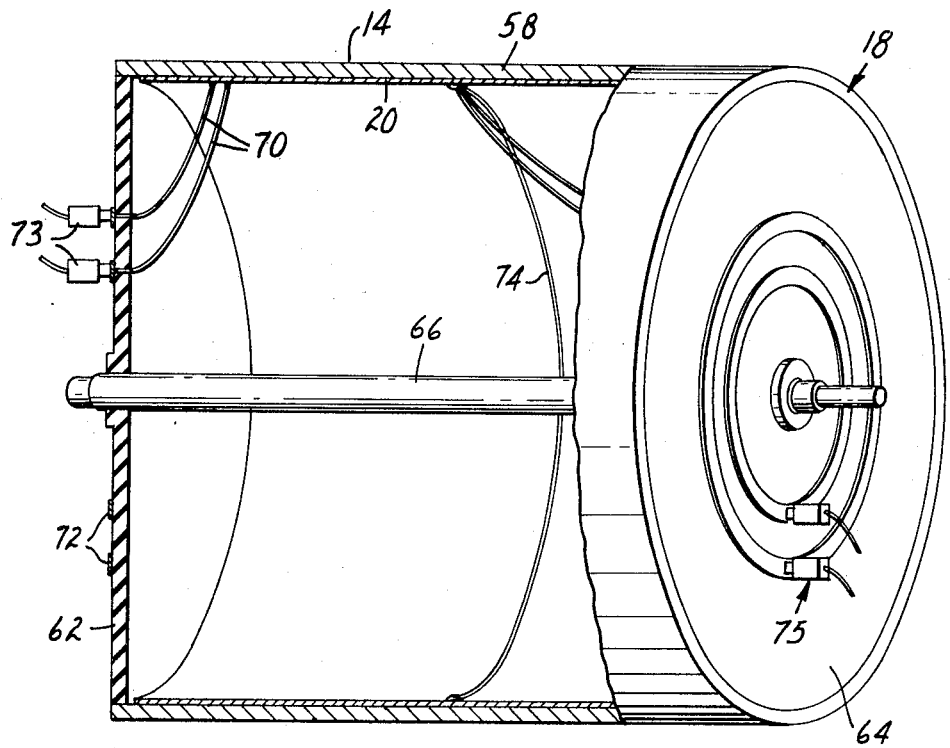
FIG. 4 is a perspective view, partially in section of the heated drum of the present invention.

The device 10 includes a rectangular frame 22 having an upper wall 24, a front wall 26, a rear wall 28, a pair of side walls 30 and 32 and a center partition 34 along with a supporting base plate. A handle 36 is mounted on each of the side walls 30 and 32 to afford a measure of portability to the device 10.

A compartment 38 is defined on the frame 22 in which the drum 18 is mounted. The compartment 38 provides a space of relatively constant temperature in which the film 12 may be developed and which restricts the cooling effect of unwanted air currents on the film 12 during development. The heated compartment 38 is defined by a portion of the walls 24, 26, 28 and 30 together with a portion of e partition 34, a partition 40, and a pair of baffles 41. The compartment 38 has a layer of insulating material 42 attached to its inner surface to restrict heat loss from the compartment 38. A pair of doors 44 are mounted on the frame 22 and afford access to the compartment 38 and the drum 18 for manual threading of the film 12 about the drum 18.

The path for the film 12 through the device 10 is defined by a series of cylindrical members rotatably mounted between the wall 30 and the partition 34.

The film 12 has its respective ends wrapped around and extends between a supply reel 46 and a take-up reel 48. The reels 46 and 48 are removably mounted on the frame 22 and may be mounted or removed through an opening 49 found in the rear wall 28. From the supply reel 46, the film 12 extends around a cleaning and tensioning roll 50, the function of which will later be explained, and thence extends about an idler roller 52 adjacent a sheet metal guide 54 which guide 54 extends partially about the roller 52 and is an aid in threading the film 12 about the roller 52. From the idler roller 52, the film 12 extends about a major portion of the drum, contacting the same for about 290° of its peripheral surface 14 and thence around a drive roller 56 and onto the take-up roll 48.

Referring now to FIG. 4 there is shown more detail on the heated drum 18 which affords intimate contact with the backing of the film 12 to provide even heat conduction into the backing of the film 12 from the heating element 20 to effect even development of the coating on the film 12. The drum 18 is cylindrical and comprises a hollow electrically and thermally conductive metal cylinder 58, the outer surface defining the peripheral surface 14, spaced disk-like end walls 62 and 64 formed of an insulating rigid resinous material, and a supporting shaft 66 positioned at the axis of the cylinder 58 and which journals the drum for rotation relative to the partition 34 and the wall 30. The peripheral surface 14 of the drum 18 has a smooth finish, and is finished to a surface roughness of less than 125 microinches, preferably in the range of 125 to 63 microinches to afford intimate contact with the film 12. The drum 18 is not driven in the direction of rotation corresponding to movement of film 12 through the device 10, but depends upon frictional contact between the film and the peripheral surface 14 to produce simultaneous movement. As relative slippage between the peripheral surface 14 and the film can effect the rate of heat transfer therebetween, and thus the degree of development of film produced, it is essential that the frictional contact between the film 12 and peripheral surface 14 be sufficient to rotate the drum 18 with a tension in the film 12 supplied by the drive means as will be explained later, limited by the requirement that the film must not stretch or distort at the elevated development temperatures (typically 275°). The smooth finish on the drum 18, however, is condusive to slippage. Additionally, the film 12 shrinks slightly upon development. It is believed that this shrinkage tends to disturb static frictional contact between the film 12 and the peripheral surface 14, and/or that drying of the film 12 during development may cause a vapor between the film 12 and the surface.

It has been found that finishing the drum so that the finish marks on the peripheral surface 14 lay axially of the drum rather than around the peripheral surface 14 affords the needed frictional contact between the drum 18 and the film 12 with an allowable amount of tension in the film 12 while affording the intimate contact required between the film 12 and peripheral surface 14 for even heat transfer. The edge of the metal cylinder 58 is grounded by a grounding roller 68 mounted on the wall 30 to prevent static electric charges from accumulating on the peripheral surface 14.

The heating means or heater 20 which heats the peripheral surface 14 of the drum 18 is a cylindrical heater assembly intimately attached to the inner surface of the cylinder 58 as by a thermally conductive adhesive, and comprises an electrically insulating layer in which a multiplicity of fine resistant heating elements are imbedded. The heater 20 is designed to give an extremely even amount of heat flow through all areas of the peripheral surface 14 and for this purpose has an increased concentration of heating elements adjacent the ends of the cylinder 58 to offset thermal edge fall-off effects. Electrical power to the heater 20 is supplied through lead wires 70 attached to a pair of concentric conductive rings 72 mounted to the electrically insulating end wall 62. The rings 72 are contacted by a pair of spring-biased contact brushes 73 mounted on the wall 30 to afford the needed electrical contact with a regulated power supply mounted on the device 10 (not shown).

A means is provided for controlling the power supply for the heater 20 to afford constant heat output through the peripheral surface 14. The regulating means comprises an annular shaped wire 74 of known resistance contacting the cylindrical heater 20 midway between the end walls 62 and 64. The wire 74 is electrically connected to a Wheat-stone bridge (not shown) which provides regulation of the power supply for the heater 20. Electrical contact between the resistance wire and the Wheat-stone bridge is maintained by a conductive ring and brush assembly 75 similar to that for providing electrical contact to the heater 20.

Figure 5:
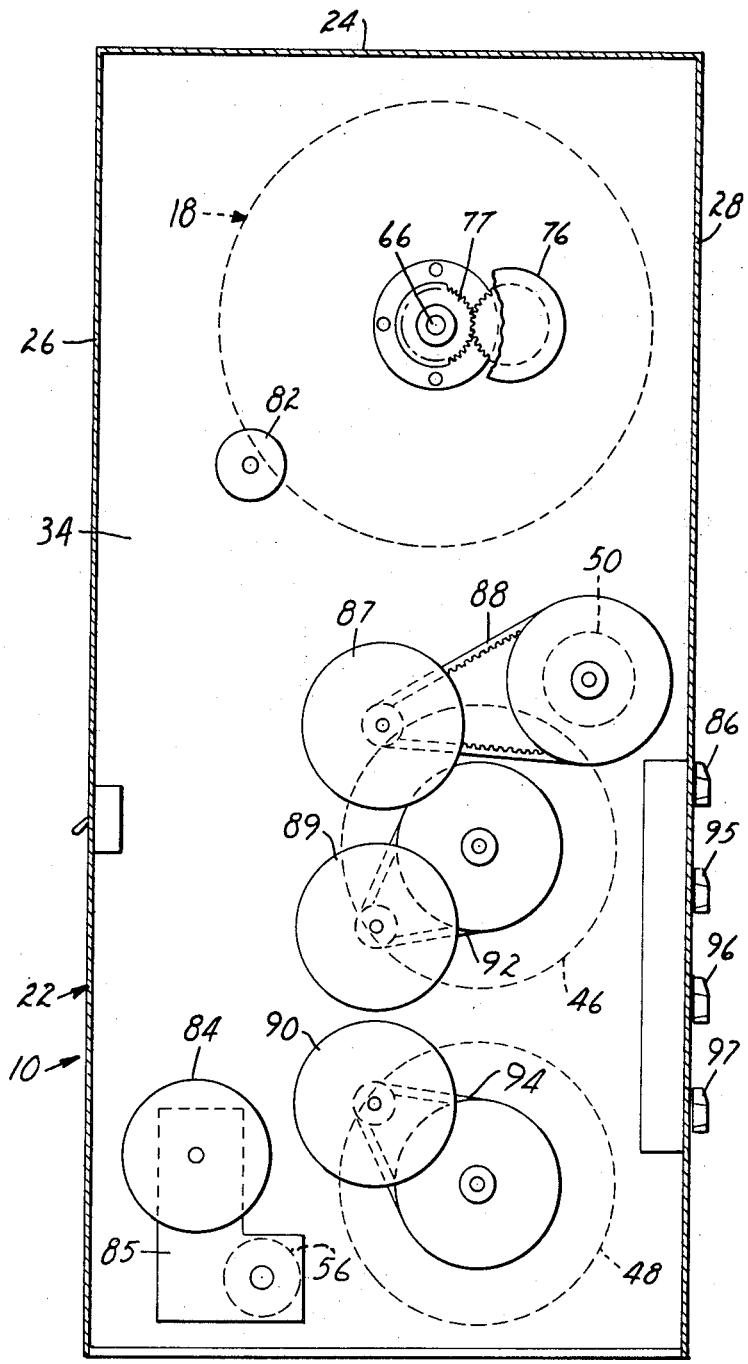
FIG. 5 is a vertical sectional view taken approximately along the lines 5—5 of FIG. 2.

Referring now to FIG. 5, means is also provided to insure evenness of temperature about the peripheral surface 14 of the drum 18 when the drum 18 is heated and the device 10 is not in use for developing a film 12. When the heater 20 in the drum 18 is operating and the drum 18 remains stationary, heat will rise and produce a concentration of heat at the uppermost surface of the tubular member 58. Upon subsequent use of the device 10 this concentrated heat source will cause irregular development of a film 12. To prevent this result, the device 10 is provided with a drive motor 76 coupled to the shaft 66 through a gear assembly and conventional one-way clutch 77. The drive motor 76 may be activated to slowly rotate the drum 18 when the heater 20 is activated and film 12 is not being developed, so that uniformity of heat content in all portions of the peripheral surface 14 will be maintained.

Referring now to FIG. 3, a cleaning means is provided in the processor of the present invention which affords the success of the heat transfer from the drum 18. The cleaning means serves to remove foreign particles or dust from between the backing of the film 12 and the peripheral surface 14 of the drum 18 prior to contact therebetween. The cleaning means comprises the surface of the roller 50 which is formed of a silicone elastomer composition such as a polydimethyl siloxane having an adequate surface tack so that any foreign particles on the backing of the film 12 will be transferred to the surface of the roller 50. Additionally, the cleaning means includes a nuclear ionizing bar 78 comprising ceramic particles as described in U.S. Letters Pat. No. 2,943,059 containing $Po^{210}$ and which provides a uniform and safe source of alpha particles which will ionize the air adjacent the film 12 to neutralize electrical charges thereon, thereby preventing further attraction of foreign particles. The cleaning means also includes a brush 80 for removing foreign particles from the peripheral surface 14 of the drum 18. The brush 80 is cylindrical with radially extending bristles and is rotatably mounted between the wall 30 and the partition 34 with its axis parallel to the axis of the drum 18 and disposed with the bristles of the brush 80 in contact with the peripheral surface 14. The brush is comprised of bristles which are capable of withstanding the surface temperature of the drum 18, and is driven through a suitable drive motor 82 (FIG. 5) for rotation in a direction opposite the direction of rotation of the drum 18 during development of a film 12.

A drive means best seen in FIG. 5 is provided for driving the film through the device 10, for tensioning the film 12 about the drum 18, and for controlling the rotation of the reels 46 and 48. The driving means comprises a variable speed drive motor 84 connected by a suitable gear box 85 to the roller 56. The speed of the motor 84 may be controlled by manipulation of a knob 86 which regulates a suitable speed control system (not shown) for the motor 84. The surface of the drive roller 56 is formed of the same silicone rubber material as the surface of the roller 50. The surfaces of both the roller 56 and the roller 50 have adequate tack to provide good frictional driving contact with the backing of the film 12. A torque motor 87 coupled through a timing belt drive assembly 88 to the roll 50 is provided to produce an adjustable resistive torque in the roller 50 to afford a desired tension in the length of film extending between the roller 50 and the roller 56 and over the drum 18, thereby affording intimate contact between the film 12 and the peripheral surface 14. Two additional torque motors 89 and 90 are coupled by timing belt drives 92 and 94 to the supply reel 46 and take-up reel 48 respectively, and apply constant torque thereto to maintain the film in a wrapped condition on the reels 46 and 48. The torque supplied by the torque motors 87, 89 and 90 is adjustable and may be regulated through appropriate regulators in a control system as by manipulation of their respective torque control switches 95, 96 and 97 available to the operator.

The drive means also provides means for rewinding a film 12 between the take-up reel 48 and the supply reel 46. By proper adjustment and operation of the torque motors 89 and 90, a film 12 which is not positioned on the path defined on the machine 10, but which extends directly between the reels 46 and 48, may be rewound between the reels 46 and 48.

A cooling means or blower assembly 98 is provided along the path of the film 12 at the point the film 12 leaves the heated compartment 38 to cool the film 12 below its development temperature and thus terminate the development thereof, and below a temperature at which the film may be wound upon the take-up spool 48 without adhesion between the film layers (typically below 120°F). The blower assembly 98 comprises a fan and motor unit 100 which propells a stream of air against the film 12, which air stream is deflected from the film 12 and exits through a series of louvers 101 in the front wall 26 of the device 10.

A viewing means or light box 102 positioned opposite an opening 110 in the front wall 26 is provided along the path for the film 12 to afford visual inspection of a developed film 12 prior to its winding upon the take-up reel 48. The light box 102 comprises a light source 104, a reflector 106 and a translucent screen 108 oriented parallel with the path of the film for diffusing light through the film and affording a lighted background against which a section of film 12 may be viewed.

Means for reducing electrical charges on the rolled film 12, or a nuclear ionizing bar 112 identical to the bar 78, may be mounted adjacent the take-up spool 48. The ionizing bar 112 will ionize the air about the spool 48 to reduce static electrical charges on the developed film 12 for purposes of operator comfort when removing the roll from the device. Also, the film will wind more evenly without the static charges being present.

The following is an example of possible design perimeters for a device 10 according to the present invention. A device 10 comprising a drum 18 having an aluminum cylindrical member 58 which is 12¼ inches in diameter and has a three-sixteenths inch wall thickness, and which drum 18 is provided with a 1,500 watt heater 20, is capable of developing a 9-inch wide heat developable film 12 at a rate of up to 25-feet per minute.

Having thus described the present invention with reference to a preferred embodiment, what is claimed is:

1. A device for developing a latent photographic image on a strip of material having a heat developable photographic coating comprising:
   a frame, means mounted on said frame for defining a path for a said strip to be developed, a cylindrical drum rotatably mounted on said frame with a portion of the cylindrical peripheral surface of said drum defining a portion of said path, said peripheral surface of said drum being continuous and having a smooth surface finish, heating means mounted in said drum for heating said peripheral surface and for producing a uniform heat transfer from said peripheral surface of said drum to said strip, enclosure means mounted on said frame around said drum for providing a uniform thermal environment about said drum, said enclosure means having openings to afford movement of said strip along said path into said enclosure means, into contact with said drum, and out of said enclosure means, cleaning means mounted on said frame for removing foreign particles from said peripheral surface of said drum and for removing foreign particles from the surface of said strip moving along said path prior to contact with said drum, and drive means mounted on said frame for driving said strip along said path and rotating said peripheral surface of said drum in synchronism with said strip moving along said path, and for tensioning the portion of said strip positioned about said drum to afford intimate contact between said peripheral surface of said drum and said strip.

2. A device according to claim 1 wherein the surface roughness of said peripheral surface of said drum is in the range of 125 to 63 microinches, and wherein the finish marks on said peripheral surface are aligned axially of said drum to afford sufficient frictional engagement between said peripheral surface and said strip to afford driving of said drum by said drive means via driving of said strip.

3. A device according to claim 1 wherein said cleaning means for said strip comprises ionizing means for removing electrostatic charges on said strip, and means for contacting foreign particles on said strip with a surface having relatively greater surface tack than the surface of said strip to remove said particles.

4. A device according to claim 1, wherein said device further includes cooling means mounted on said frame for cooling said strip subsequent to separation of said strip from said peripheral surface.

5. A device according to claim 1, wherein said path extends around a major portion of said peripheral surface.

6. A device according to claim 5, wherein said path covers at least three quarters of said peripheral surface.

7. A device according to claim 1 wherein said device further comprises means mounted on said frame for rotating said drum when said heating means is activated and said strip is not positioned along said path, thereby affording retention of an even temperature on said peripheral surface when said strip is not positioned along said path.

8. A device according to claim 1 comprising a supply spool and a take-up spool each rotatably and removably mounted on said frame and connected to said driving means, wherein said strip is driven by said drive means from said supply spool to said take-up spool along said path to afford development of said strip, and wherein said drive means further provides means for rewinding said strip between said take-up spool and said supply spool.

9. A device according to claim 1 wherein said drive means comprises:

a first roller rotatably mounted on said frame, a portion of the peripheral surface of said first roller defining a portion of said path subsequent to said path portion defined by said drum and providing frictional contact with said strip; and a second roller rotatably mounted on said frame, a portion of the peripheral surface of said second roller defining a portion of said path prior to said path portion defined by said drum and providing frictional contact with said strip; and wherein said drive means drives said first roller to drive said strip along said path, and provides a resistive torque on said second roller for tensioning said strip about said peripheral surface of said drum.

10. A device according to claim 9 wherein the peripheral surfaces of said first and of said second rollers are defined by a polydimethyl siloxane silicone elastomer composition having an adhesive property for particulate material, and wherein the peripheral surface of said second roller comprises said portion of said cleaning means for removing foreign particles from said strip.

11. A device for developing a latent photographic image on a strip of material having a heat developable photographic coating comprising:

a frame;

means mounted on said frame for defining a path for a said strip of material to be developed;

a cylindrical drum rotatably mounted on said frame with a portion of the cylindrical peripheral surface of said drum defining a portion of said path, said peripheral surface of said drum being continuous and having a surface finish in the range of 125 to 63 microinches with the finish marks on said peripheral surface aligned axially of said drum;

heating means mounted in said drum for heating said peripheral surface and for producing a uniform heat transfer from said peripheral surface of said drum to said strip of material;

cleaning means mounted on said frame for removing foreign particles from said peripheral surface of said drum and from the surface of said strip of material prior to contact with said drum; and drive means mounted on said frame for driving said strip of material along said path and rotating said peripheral surface of said drum in synchronism with said strip of material moving along said path, and for tensioning the portion of a said strip of material extending about said drum to provide intimate contact between said peripheral surface of said drum and said strip of material, said drive means driving said drum only via driving of said strip of material.

12. A device for developing a latent photographic image on a strip of material having a heat developable photographic coating comprising:

a frame;

means mounted on said frame for defining a path for a said strip of material to be developed;

a cylindrical drum rotatably mounted on said frame with a portion of the cylindrical peripheral surface of said drum defining a portion of said path, said peripheral surface of said drum being continuous and having a smooth surface finish;

heating means mounted in said drum for heating said peripheral surface and for producing a uniform heat transfer from said peripheral surface of said drum to said strip of material;

cleaning means mounted on said frame for removing foreign particles from said peripheral surface of said drum and from the surface of said strip of material prior to contact with said drum, comprising ionizing means for removing electrostatic charges on said strip of material, and means for contacting foreign particles on the surface of said strip with a surface having relatively greater surface tack than the surface of said strip to remove said particles; and drive means mounted on said frame for driving said strip of material along said path and rotating said peripheral surface of said drum in synchronism with said strip of material moving along said path, and for tensioning the portion of said strip of material extending about said drum to provide intimate contact between said peripheral surface of said drum and said strip of material.

13. A device for developing a latent photographic image on a strip of material having a heat developable photographic coating comprising:

a frame;

means mounted on said frame for defining a path for a said strip of material to be developed;

a cylindrical drum rotatably mounted on said frame with a portion of the cylindrical peripheral surface of said drum defining a portion of said path, said peripheral surface of said drum being continuous and having a smooth surface finish;

heating means mounted in said drum for heating said peripheral surface and for producing a uniform heat transfer from said peripheral surface of said drum to said strip of material;

cleaning means mounted on said frame for removing foreign particles from said peripheral surface of said drum and from the surface of said strip of material prior to contact with said drum;

drive means mounted on said frame for driving said strip of material along said path and rotating said peripheral surface of said drum in synchronism with said strip of material moving along said path, and for tensioning the portion of said strip of material extending about said drum to provide intimate contact between said peripheral surface of said drum and said strip of material; and cooling means mounted on said frame for cooling said strip of material immediately subsequent to separation of said strip of material from said peripheral surface.

14. A device for developing a latent photographic image on a strip of material having a heat developable photographic coating comprising:

a frame;

means mounted on said frame for defining a path for a said strip of material to be developed;

a cylindrical drum rotatably mounted on said frame with a major portion of the cylindrical peripheral surface of said drum defining a portion of said path, said peripheral surface of said drum being continuous and having a smooth surface finish;

heating means mounted in said drum for heating said peripheral surface and for producing a uniform heat transfer from said peripheral surface of said drum to said strip of material;

cleaning means mounted on said frame for removing foreign particles from said peripheral surface of said drum and from the surface of said strip of material prior to contact with said drum; and drive means mounted on said frame for driving said strip of material along said path and rotating said peripheral surface of said drum in synchronism with said strip of material moving along said path, and for tensioning the portion of said strip of material extending about said drum to provide intimate contact between said peripheral surface of said drum and said strip of material.

15. A device according to claim 14 wherein said path extends around at least three quarters of the peripheral surface of said drum.

16. A device for developing a latent photographic image on a strip of material having a heat developable photographic coating comprising:

a frame;

means mounted on said frame for defining a path for a said strip of material to be developed;

a cylindrical drum rotatably mounted on said frame with a portion of the cylindrical peripheral surface of said drum defining a portion of said path, said peripheral surface of said drum being continuous and having a smooth surface finish;

heating means mounted in said drum for heating said peripheral surface and for producing a uniform heat transfer from said peripheral surface of said drum to said strip of material;

cleaning means mounted on said frame for removing foreign particles from said peripheral surface of said drum and from the surface of said strip of material prior to contact with said drum;

drive means mounted on said frame for driving said strip of material along said path and rotating said peripheral surface of said drum in synchronism with said strip of material moving along said path, and for tensioning the portion of a said strip of material extending about said drum to provide intimate contact between said peripheral surface of said drum and said strip of material; and means mounted on said frame for rotating said drum when said heating means is activated and said strip of material is not positioned along said path, thereby affording retention of an even temperature on said peripheral surface when a said strip of material is not positioned along said path.

17. A device for developing a latent photographic image on a strip of material having a heat developable photographic coating comprising:

a frame;

a supply spool and a take-up spool each rotatably and removably mounted on said frame;

means mounted on said frame for defining a path for said strip of material to be developed from said supply to said take-up spool;

a cylindrical drum rotatably mounted on said frame with a portion of the cylindrical peripheral surface of said drum defining a portion of said path, said peripheral surface of said drum being continuous and having a smooth surface finish;

heating means mounted in said drum for heating said peripheral surface and for producing a uniform heat transfer from said peripheral surface of said drum to said strip of material;

cleaning means mounted on said frame for removing foreign particles from said peripheral surface of said drum and from the surface of said strip of material prior to contact with said drum;

drive means connected to said spools and mounted on said frame for driving a said strip of material along said path between said spools and rotating said peripheral surface of said drum in synchronism with said strip of material moving along said path, and for tensioning the portion of said strip of material extending about said drum to provide intimate contact between said peripheral surface of said drum and said strip of material, said drive means further including means for rewinding said strip between said take-up spool and said supply spool.

18. A device for developing a latent photographic image on a strip of material having a heat developable photographic coating comprising:

a frame;

means mounted on said frame for defining a path for a said strip of material to be developed;

a cylindrical drum rotatably mounted on said frame with a portion of the cylindrical peripheral surface of said drum defining a portion of said path, said peripheral surface of said drum being continuous and having a smooth surface finish;

heating means mounted in said drum for heating said peripheral surface and for producing a uniform heat transfer from said peripheral surface of said drum to said strip of material;

cleaning means mounted on said frame for removing foreign particles from said peripheral surface of said drum and from the surface of said strip of material prior to contact with said drum;

drive means mounted on said frame for driving said strip of material along said path and rotating said peripheral surface of said drum in synchronism with said strip of material moving along said path, and comprising;

a first roller rotatably mounted on said frame, a portion of the peripheral surface of said roller defining a portion of said path subsequent to said path portion defined by said drum and providing frictional contact with said strip of material; and a second roller rotatably mounted on said frame, a portion of the peripheral surface of said second roller defining a portion of said path prior to said path portion defined by said drum and providing frictional contact with said strip of material, said drive means driving said first roller to drive said strip along said path, and providing a resistive torque on said second roller for tensioning said strip of material about said peripheral surface to provide intimate contact between said peripheral surface of said drum and said strip of material.

19. A device according to claim 18 wherein the peripheral surfaces of said first and second rollers are defined by a polydimethyl siloxane silicone elastomer composition, having an adhesive property for particulate material, and the peripheral surface of said second roller comprises said portion of said cleaning means for removing foreign particles from said strip of material.

* * * * *